(12) United States Patent
Jeuk et al.

(10) Patent No.: US 11,190,956 B2
(45) Date of Patent: Nov. 30, 2021

(54) ASSOCIATION-RULES BASED ON BSS- AND AFFINITY-COLORING

(71) Applicant: Cisco Technology, Inc., San Jose, CA (US)

(72) Inventors: Sebastian Jeuk, Munich (DE); Gonzalo A. Salgueiro, Raleigh, NC (US); M. David Hanes, Lewisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/752,313

(22) Filed: Jan. 24, 2020

(65) Prior Publication Data

US 2021/0235286 A1 Jul. 29, 2021

(51) Int. Cl.
  *H04W 4/00* (2018.01)
  *H04W 24/02* (2009.01)
  *H04W 48/16* (2009.01)
  *H04W 84/12* (2009.01)

(52) U.S. Cl.
  CPC .......... *H04W 24/02* (2013.01); *H04W 48/16* (2013.01); *H04W 84/12* (2013.01)

(58) Field of Classification Search
  CPC ..... H04W 28/04; H04W 28/16; H04W 24/00; H04W 24/02; H04W 16/10; H04W 16/14; H04W 48/16; H04W 72/04; H04W 72/042; H04W 72/082; H04W 76/02; H04W 88/08
  USPC ............... 370/329; 455/450, 452.1
  See application file for complete search history.

(56) References Cited

U.S. PATENT DOCUMENTS

| 9,794,829 | B2 | 10/2017 | Seok |
| 9,854,607 | B1 | 12/2017 | Chu et al. |
| 10,206,246 | B2 | 2/2019 | Huang et al. |
| 10,433,345 | B2 | 10/2019 | Kim et al. |

(Continued)

FOREIGN PATENT DOCUMENTS

WO 2017217767 A1 12/2017

OTHER PUBLICATIONS

PCT Notification of Transmital of The International Search Report and The Written Opinion of The International Searching Authority, or The Declaration for Application PCT/US2021/070068 dated Jul. 2, 2021.

(Continued)

*Primary Examiner* — Temica M Beamer
(74) *Attorney, Agent, or Firm* — Patterson + Sheridan, LLP (57) ABSTRACT

Embodiments herein describe association rules (e.g., affinity and anti-affinity rules) that a wireless device can use to optimize its performance in a Wi-Fi network. While BSS coloring is typically used to eliminate color collisions, the embodiments herein use BSS coloring to define what BSS colors should be on the same channel and which should not. For example, an affinity rule can indicate that a wireless device assigned a first BSS color (e.g., red) can share the same channel with wireless devices (or BSSs) assigned a second BSS color (e.g., green). In contrast, an anti-affinity rule can indicate that a wireless device in the red BSS color cannot share a channel with a wireless device assigned to a third BSS color (e.g., blue). The embodiments herein permit the wireless devices to be grouped with, or separated from, wireless devices having different BSS colors.

19 Claims, 5 Drawing Sheets

(56) References Cited

U.S. PATENT DOCUMENTS

| | | |
|---|---|---|
| 2013/0150011 A1 | 6/2013 | Tofighbakhsh et al. |
| 2014/0313988 A1 | 10/2014 | Hsu et al. |
| 2018/0098378 A1 | 4/2018 | Patil et al. |
| 2018/0184285 A1* | 6/2018 | Patil .................... H04L 61/2038 |
| 2018/0270038 A1* | 9/2018 | Oteri ..................... H04L 5/0037 |
| 2019/0021106 A1 | 1/2019 | Oteri et al. |
| 2019/0268892 A1* | 8/2019 | Gidvani ................ H04W 76/11 |
| 2020/0059932 A1* | 2/2020 | Hahn ..................... H04L 41/12 |
| 2020/0403680 A1* | 12/2020 | Li ........................ H04B 7/0695 |

OTHER PUBLICATIONS

PCT Invitation to Pay Additional Fees and, Where Applicable, Protest Fee, for Application No. PCT/US2021/070068 dated May 11, 2021.

* cited by examiner

ASSOCIATION-RULES BASED ON BSS- AND AFFINITY-COLORING

TECHNICAL FIELD

Embodiments presented in this disclosure generally relate to using association rules (e.g., affinity and anti-affinity rules) to determine when a network device should take an action based on BSS-coloring and affinity-coloring.

BACKGROUND

A basic service set (BSS) includes at least one access point (AP) and one or more client stations (referred to herein as endpoints) that are in wireless communication. IEEE 802.11ax (i.e., Wi-Fi 6) compatible radios can differentiate between BSSs using a BSS color value when other radios transmit on the same channel in the same frequency band (e.g., the 2.4 GHz, 5 GHz, or 6 GHz frequency bands). If the BSS color in a received frame is the same as the color of the receiving network device, this is considered to be an intra-BSS frame transmission. In other words, the transmitting radio belongs to the same BSS as the receiving network device. If the detected frame has a different BSS color from the receiving network device, then the endpoint considers that frame as an inter-BSS frame from an overlapping BSS. In this manner, using colors helps APs and endpoints to identify overlapping BSS where network devices in other BSSs are within wireless communication.

APs often overlap with one or more other BSSs (i.e., the APs are within transmission range of, and using the same channel as, one or more of the devices that define the other BSS). This can result in color collision which occurs when the AP receives a frame from a wireless device associated with the overlapping BSS that is using the same color. To eliminate color collision, an AP can change its BSS color (as well as the color of all the other endpoints in the same BSS) if it detects an overlapping BSS using the same color.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a method that includes receiving, at a wireless device, a frame comprising a physical (PHY) header, determining a first color value from a BSS color field in the PHY header, and determining whether an association rule for the wireless device is satisfied based on the first color value and a color assigned to the wireless device, wherein the association rule lists at least one color value that the wireless device either can or cannot share a channel with, wherein the at least one color value is different than the color assigned to the wireless device.

Another embodiment described herein is a wireless device that includes a process and memory comprising a program configured to perform an operation when executed by the processor. The operation includes determining a first color value from a BSS color field in a PHY header of a frame received at the wireless device and determining whether an association rule for the wireless device is satisfied based on the first color value and a color assigned to the wireless device where the association rule lists at least one color value that the wireless device either can or cannot share a channel with and the at least one color value is different than the color assigned to the wireless device.

Another embodiment described herein is a wireless device that includes a process and memory comprising a program configured to perform an operation when executed by the processor. The operation includes identifying metadata associated with an AP, transmitting a first frame from the AP, the first frame comprising a first PHY header that includes a first indicator and a first field where the first indicator indicates that the first field is repurposed to include the metadata, and transmitting a second frame from the AP containing a second PHY header comprising a second indicator and the first field where the second indicator indicates that the first field contains data intended for the first field according to a Wi-Fi standard.

Example Embodiments

Embodiments herein describe association rules (e.g., affinity and anti-affinity rules) that a wireless device can use to optimize its performance in a Wi-Fi network. While BSS coloring is typically used to eliminate color collisions (where network devices in different BSSs have the same color), the embodiments herein use BSS coloring to define what BSS colors should be on the same channel and which should not. For example, an affinity rule can indicate that a wireless device assigned a first BSS color (e.g., red) can share the same channel with wireless devices (or BSSs) assigned a second BSS color (e.g., green). In contrast, an anti-affinity rule can indicate that a wireless device in the red BSS color cannot share a channel with a wireless device assigned to a third BSS color (e.g., blue). Rather than merely preventing coloring collisions between the same color, the embodiments herein permit the wireless devices to be grouped with, or separated from, wireless devices having different BSS colors.

In addition to defining associate rules based on color, in one embodiment, the BSS color fields in frames can be repurposed to transmit metadata associated with an AP (referred to as affinity coloring) rather than the data that the Wi-Fi standard intended to be that field (e.g., the BSS color value as defined in IEEE 802.11ax). Using predefined indicators in a PHY header, an AP can indicate to a receiving wireless device that the BSS color field in the header has been repurposed to transmit metadata about the AP instead of (or in addition to) a BSS color value. This metadata can include performance information regarding a service provided by the AP (e.g., an HyperText Transfer Protocol (HTTP), secure shell (SSH), File Transfer Protocol (FTP), Voice over IP (VoIP), or streaming service) or a performance status of the AP (e.g., the AP's utilization, congestion, or whether it is out of service). The association rules can consider this metadata, along with the BSS colors, when determining whether a wireless device should change to a different channel or color. For example, an association rule may indicate that an AP and its endpoints should change to a different channel if the current channel includes another AP assigned to the blue BSS color and executes a service that requires low latency or has over 50% congestion. In this manner, the BSS color field can be repurposed to transmit metadata regarding the AP and the services executing on the AP which enables the wireless devices to use finer-grained association rules to optimize the wireless network.

Figure 1:
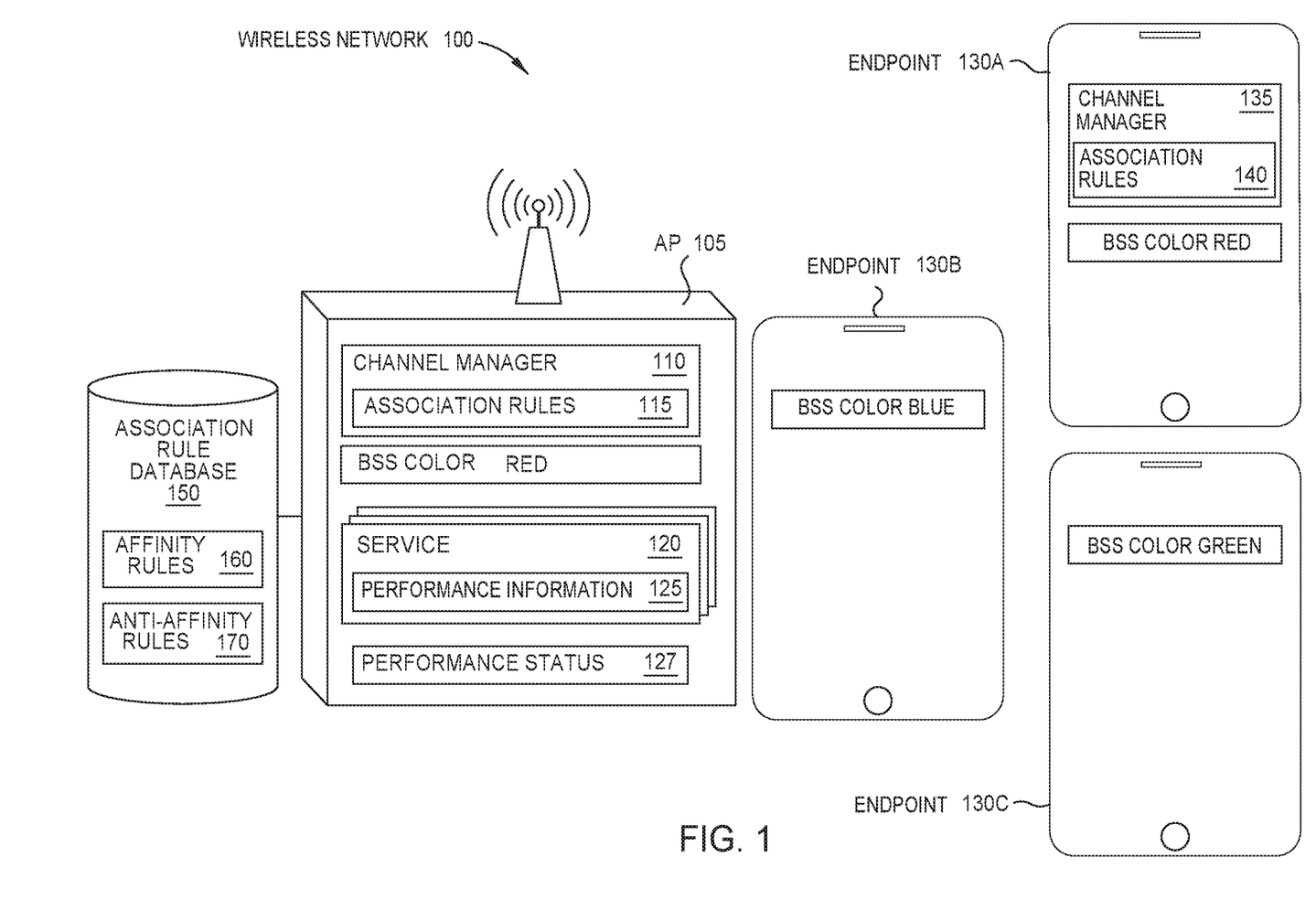
FIG. 1 illustrates a wireless network that uses association rules to manage the colors and channels used by the wireless devices, according to one embodiment.

FIG. 1 illustrates a wireless network 100 that uses association rules to manage the color and channels used by the wireless devices, according to one embodiment. As shown, the wireless network 100 includes an AP 105, a plurality of endpoints 130 (e.g., client stations such as mobile phone, laptop, tablet, and the like), and an association rule database 150. In one embodiment, the AP 105 and endpoints 130 are compatible with IEEE 802.11ax which permits wireless devices to be assigned to colors as part of joining a BSS.

The AP 105 includes a channel manager 110 (e.g., a software application that is stored in memory and executed by a processor in the AP 105) that stores association rules 115 for managing its BSS color and the channel used by the AP to communicate wirelessly with the endpoints 130. The association rules 115 can include affinity rules 160 (e.g., rules indicating which BSS colors the AP 105 can share a channel with) and anti-affinity rules 170 (e.g., rules indicating which BSS colors the AP cannot share a channel with). In this example, the AP 105 is assigned to the BSS color red. In one embodiment, all the wireless devices in the network 100 that are part of the same BSS as the AP 105 are also assigned the BSS color red. Thus, because the endpoint 130A is also assigned the BSS color red, it is assigned to the same BSS as the AP 105. In contrast, the endpoints 130B and 130C are assigned different BSS colors (blue and green, respectively) thereby indicating they are part of a different BSS.

The AP 105 can receive frames from wireless devices that operate in the same channel (e.g., one of the channels in the 2.4 GHz, 5 GHz, or 6 GHz frequency bands). These frames can be received from the endpoints 130 and other APs (not shown). That is, although the endpoints 130B and 130C are in different BSSs, they use the same channel as the AP 105, and thus, the AP 105 can receive their frames.

Using BSS color fields in the header of the frames, the AP 105 can identify the BSS colors of the endpoints 130. That is, the channel manager 110 can process the headers to determine that the endpoint 130A is assigned the BSS color red, the endpoint 130B is assigned the BSS color blue, and the endpoint 130C is assigned the BSS color green. As described in more detail below, the channel manager 110 can use the association rules 115 to determine, based on its own BSS color, whether the AP 105 should, or should not, occupy the same channel as the other BSS colors. For example, an association rule 115 may indicate that wireless devices with the BSS color of red can share a channel with wireless devices with BSS colors of blue and green. Conversely, if the endpoint 130B recently moved into range of the AP 105 and the association rule 115 indicates that wireless devices in the BSS color red cannot be in the same channel as wireless devices in the BSS color blue (e.g., because of the different bandwidth, latency requirements, or services corresponding to the BSSs), then the AP 105 (or the endpoint 130B) may have to take an action such as changing channels or using a different BSS color.

The AP 105 also includes services 120 executing thereon. These services 120 can include HTTP, FTP, and SSH services. An HTTP service can further be subdivided into VoIP, HTTP streaming, or cloud services which use HTTP to perform their specialized functions. In general, the services 120 (which may be performed using software, hardware, or a combination of both) manage the network traffic flowing between the endpoint 130A and a wired backend (not shown), and are not limited to the examples provided.

The services 120 include performance information 125 that describe the performance requirements of the services 120. For example, one service 120 may require low latency (i.e., is latency sensitive) or another service 120 is bandwidth intensive. The performance information 125 provides information about the service 120 that can then be used to decide whether to move to a different channel or stay on the same channel. In one embodiment, the AP 105 transmits frames with repurposed BSS color fields to include the performance information 125. That is, rather than the BSS color fields indicating the BSS color of the AP 105 (i.e., red), the color field can include the performance information 125 so that a neighboring AP (not shown) that receives the frame can decode the BSS header to identify the performance information 125 of the AP 105. Instead of solely considering the BSS color, the association rules 115 can also consider the performance information 125 received from neighboring APs. For example, the association rule 115 may stipulate that the AP 105 can share the same channel as a neighboring AP if that AP is assigned either a blue or green BSS color (e.g., a list of BSS colors) and has no bandwidth intensive services 120. In this manner, transmitting the performance information 125 between APs can increase the granularity of the association rules 115 to consider more factors than BSS color when taking an action.

The AP 105 also stores a performance status 127 that indicates, e.g., congestion on the AP 105, utilization of the AP 105, or availability of the AP 105 (whether the AP is being upgraded or is currently out-of-service). Like with the performance information 125, the BSS color fields in a header of a frame can be repurposed to include the performance status 127 so the neighboring APs can receive the performance status 127 and use corresponding association rules 115 to determine whether to change channels or a color. Like with the performance information 125, transmitting the performance status 127 between APs can increase the granularity of the association rules 115 to consider more factors than BSS color when taking an action.

In FIG. 1, the endpoint 130A also has a channel manager 135 with accompanying association rules 140. In one embodiment, the association rules 140 for endpoint 130A may be the same or different from the rules 115 used by the AP 105. Like the AP 105, the endpoint 130A can receive frames from neighboring endpoints 130 and APs and compare the information contained in the BSS color fields (e.g., the BSS colors, performance information 125, and performance status 127) to determine whether to move to a different channel or to change its BSS color. If moving to a different channel, the channel manager 135 may first negotiate this move with the AP in its same BSS (i.e., the AP 105).

In another embodiment, rather than making a determination at the endpoint 130A, the endpoint 130A may forward the information it receives to the AP 105 which makes the decision. For example, the endpoint 130A may be in wireless communication with wireless devices that the AP 105 is not. Thus, the endpoint 130A may receive frames that have information in their BSS color fields about neighboring APs and endpoints that are not received by the AP 105. The endpoint 130A can put this information in a packet or packets and forward it to the AP 105. The AP 105 can then decide to change the channel or BSS color and forward instructions back to the endpoint 130A. For example, if the AP 105 decides to change it channel, it can instruct the other wireless devices assigned to the same color (i.e., the same BSS) to change to the same channel so that communication is maintained.

The association rule database 150 stores affinity rules 160 and anti-affinity rules 170. The database 150 may be a local database (e.g., part of a WLAN controller) or a cloud database. In either case, the database 150 can forward these rules (or a portion thereof) to the AP 105 and the endpoint 130A as represented by the association rules 115 and 140. For example, the database 150 may store affinity and anti-affinity rules 160 and 170 for each particular BSS color— i.e., a set of affinity and anti-affinity rules 160 and 170 for the BSS color red, a set of affinity and anti-affinity rules 160 and 170 for the BSS color blue, a set of affinity and anti-affinity rules 160 and 170 for the BSS color green, and so forth. In that example, the AP 105 and the endpoint 130A may have the same association rules while the endpoints 130B and 130C (and their corresponding APs) may use a different set of association rules.

Figure 2:
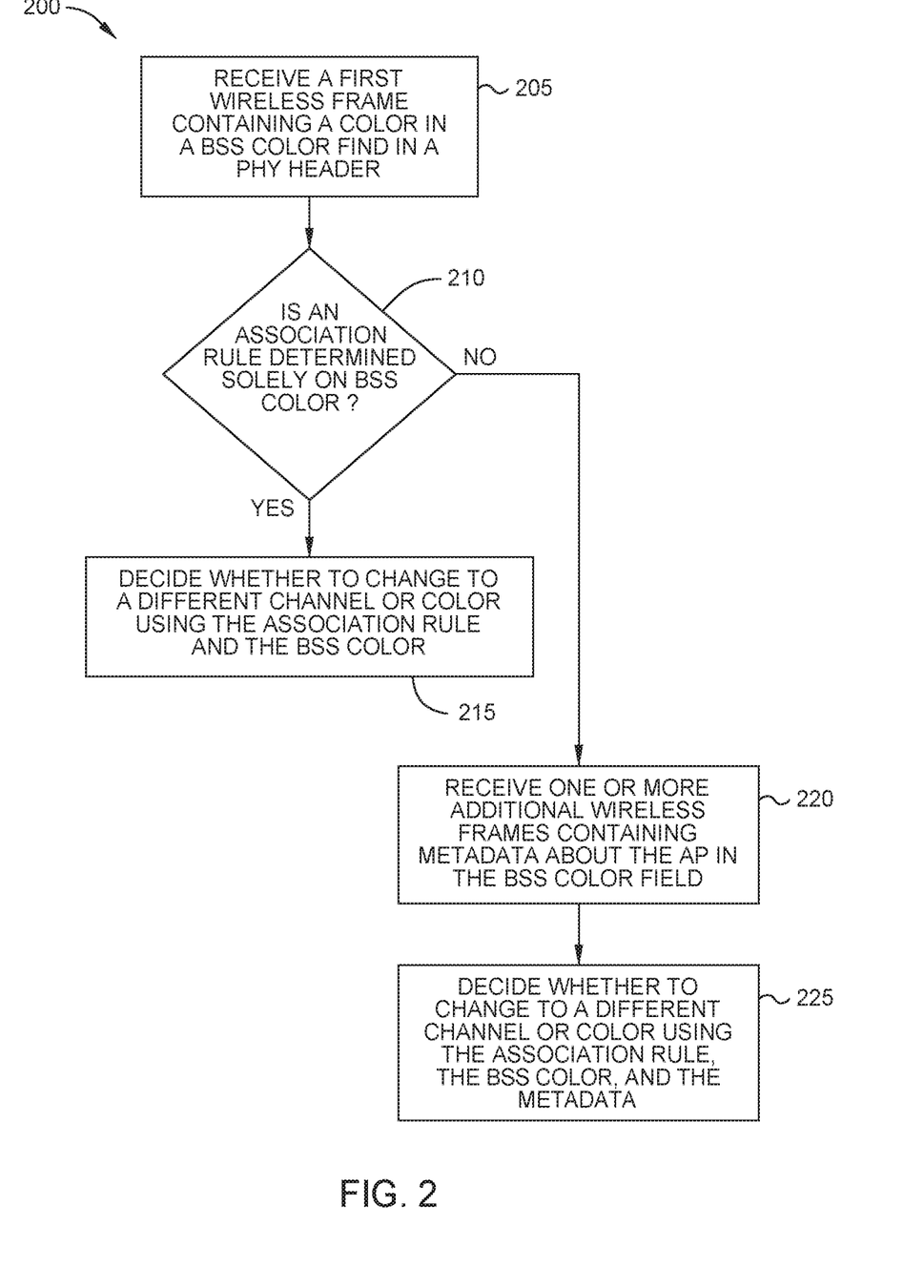
FIG. 2 is a flowchart for changing a channel or BSS color using association rules defining relationship between different BSS colors, according to one embodiment.

FIG. 2 is a flowchart of a method 200 for changing a channel or BSS color using association rules defining relationship between different BSS colors, according to one embodiment. At block 205, a wireless device (e.g., an AP or an endpoint) receives a first wireless frame containing a color in a BSS color field in a PHY header. In IEEE 802.11ax, the PHY header in a wireless frame includes six bits used to assign a BSS color. When receiving a frame, the wireless device can evaluate these six bits in their predefined locations within the header to identify the BSS color assigned to the transmitting device. Thus, while the BSS colors are described as colors herein, in actuality the BSS color are bit values encoded in the six bits in the PHY header.

At block 210, the channel manager in the wireless device determines whether an association rule is determined solely on BSS color. That is, the wireless device may store one or more association rules as discussed above (e.g., affinity or anti-affinity rules). Some of the association rules may evaluate only the BSS color (i.e., do not consider other information such as the performance information 125 or performance status 127 illustrated in FIG. 1). An example of such an association rule is that a wireless device assigned the BSS color red can occupy the same wireless channel as wireless devices assigned the BSS colors green and blue. An example of anti-affinity rule based solely on BSS color is that a wireless device assigned the color red cannot occupy the same wireless channel as wireless device assigned the BSS color black.

For the association rules based solely on BSS color, the method 200 can proceed to block 215 where the channel manager evaluates its BSS color (e.g., the BSS color assigned to the wireless device on which it executes) and the BSS color in the received frame to the associate rule (or rules) to decide whether to change to a different channel or color. For example, an affinity rule may indicate the wireless device can stay on the channel (and not change its color) while an anti-affinity rule can indicate the wireless device should change to a different channel or change its BSS color.

In one embodiment, before taking an action at block 215, the wireless device may first receive permission from a WLAN controller (if the wireless device is an AP) or from an AP (if the wireless device is an endpoint). For example, an AP may first request permission from a WLAN controller to change its BSS color (and the color of the endpoints in the same BSS), or an endpoint may send a request to an AP to change the color of the BSS.

For the association rules that consider more factors than BSS color, instead of proceeding to block 215, the method proceeds to block 220 where the wireless device receives one or more additional wireless frames containing metadata about an AP in the BSS color field. For these frames, at least one bit in the BSS color field in the PHY header is repurposed to carry metadata about the AP. That is, instead of the six bits being used to carry the BSS color, at least one bit is repurposed to carry metadata such as the performance information 125 or the performance status 127 of the AP 105 in FIG. 1. As discussed below, some or all of the six bits may be repurposed to carry the metadata. If not all the bits are repurposed, the remaining bits in the BSS color field can be used to indicate the BSS color value (e.g., four or five bits may be sufficient to represent all the BSS colors used in the wireless network). The various techniques for transmitting the metadata in the BSS colors fields are described in more detail in the later figures.

In one embodiment, an AP can transmit a frame containing the metadata in the BSS color field at a predefined frequency. For example, for every five frames an AP transmits, four of those frames contain its BSS color while one of the frames has a BSS color field repurposed to transmit metadata. In another embodiment, the frequency at which the AP transmits a frame with the metadata is linked to the services the AP is handling. For example, if the AP has static services where the characteristics of the services do not change often over time, the frequency can be lower. If the AP handles ever changing services, the frequency should reflect these changes by advertising the metadata more frequently.

At block 225, the channel manager decides whether to change to a different channel or color using the association rule (or rules), the BSS color, and the metadata. For example, an association rule may forbid the wireless device from sharing the same channel as a wireless device assigned the BSS color brown and that has either a utilization over 60% or a low-latency HTTP service. In this example, the utilization and low-latency information of the transmitting wireless device are provided to the receiving wireless device as metadata stored in the BSS color field in one or more frames. The channel manager can compare the received metadata to the thresholds set in the association rule to determine whether to change its channel or color.

In one embodiment, the association rule may not consider the BSS color when determining whether to change the channel or color. For example, the association rule may state that the wireless device should change its color or move to a different channel when a neighboring AP has a utilization over 80% and low-latency HTTP service. The wireless device may take an action regardless of the BSS color the neighboring AP. Thus, some or all of the association rules may not depend on the BSS color of the transmitting wireless device.

In another embodiment, the association rules consider physical Wi-Fi characteristics, such as Wi-Fi channel overlap. The WLAN controller already knows what frequencies are used in the network and the number of channels. The WLAN controller can use channel overlap as a predefined value in the association rules. For example, the WLAN controller knows the percentage the channels overlap and can set up the association rules so that wireless devices do not, for example, move to a channel that is only 25% different from its current channel from a frequency perspective.

In one embodiment, the association rules have a time delay associated with them. Because there is often different services operating on the same channel, based on the performance information provided in the repurposed BSS color field, the wireless device can predict the utilization is changing very soon, and in response, the device does not take action according to the association rule for, e.g., twenty seconds for the new utilization to take effect. The wireless device could re-check the association rule after the delay, and if its condition (or conditions) is still met, take the corresponding action.

In one embodiment, a WLAN controller can use a machine learning algorithm or artificial intelligence to adjust the association rules over time. That is, the WLAN controller can measure metrics regarding the performance of the wireless network based on the current association rules. The machine learning algorithm can then adjust the rules based on the metrics to improve performance.

Figure 3:
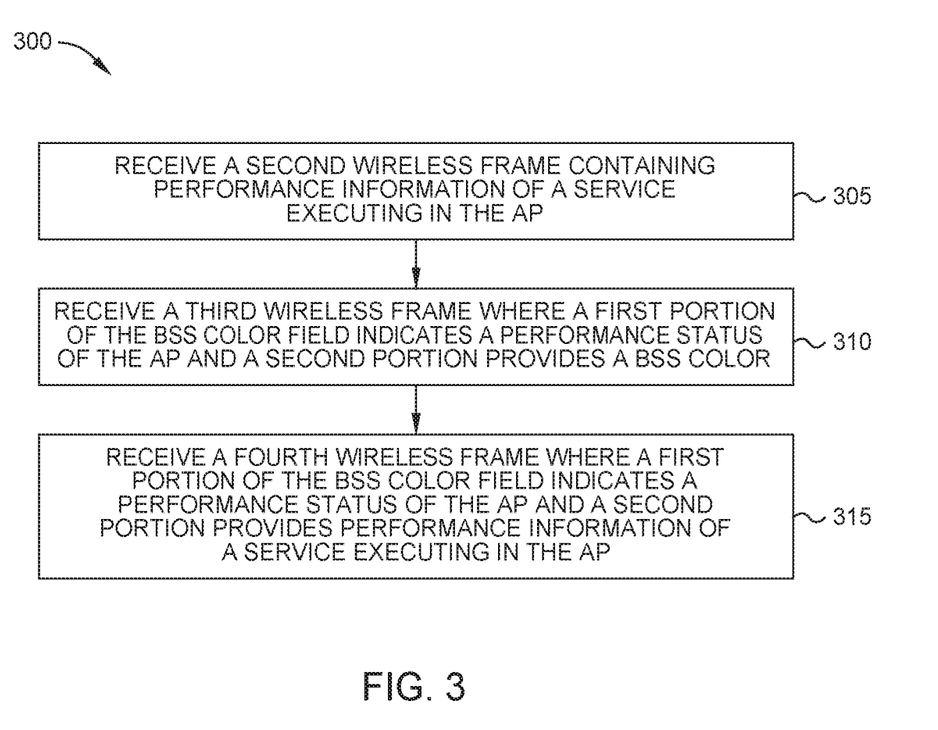
FIG. 3 is a flowchart for repurposing the BSS color field in a frame to transmit metadata corresponding to an AP, according to one embodiment.

FIG. 3 is a flowchart of a method 300 for repurposing the BSS color field in a frame to transmit metadata corresponding to an AP, according to one embodiment. The blocks 305-315 provide more detail for block 220 in method 200. More specifically, the blocks 305-315 describe receiving wireless frames that contain metadata in BSS color field that are formatted differently. Although the method 300 describes a wireless device receiving frames having all the different formats, different wireless networks may use only one or two of the different formats described below. That is, a wireless device may receive frames that format the metadata using only one technique while another wireless device may receive frames using multiple different techniques for transmitting metadata. Also, for clarity, the different blocks in the method 300 are discussed in parallel with FIGS. 4-6.

At block 305, the wireless device receives a second wireless frame containing performance information of a service executing in the AP. As mentioned above, the service may include an HTTP, SSH, FTP, VoIP, or streaming service. In one embodiment, the performance information describes a performance characteristic or requirement of at least one service executing on the AP. For example, the service may require low latency to function properly, is bandwidth intensive, or operates poorly with another service. In this manner, the performance information includes metadata about the service that can be compared to the association rules stored in the receiving wireless device.

Figure 4:
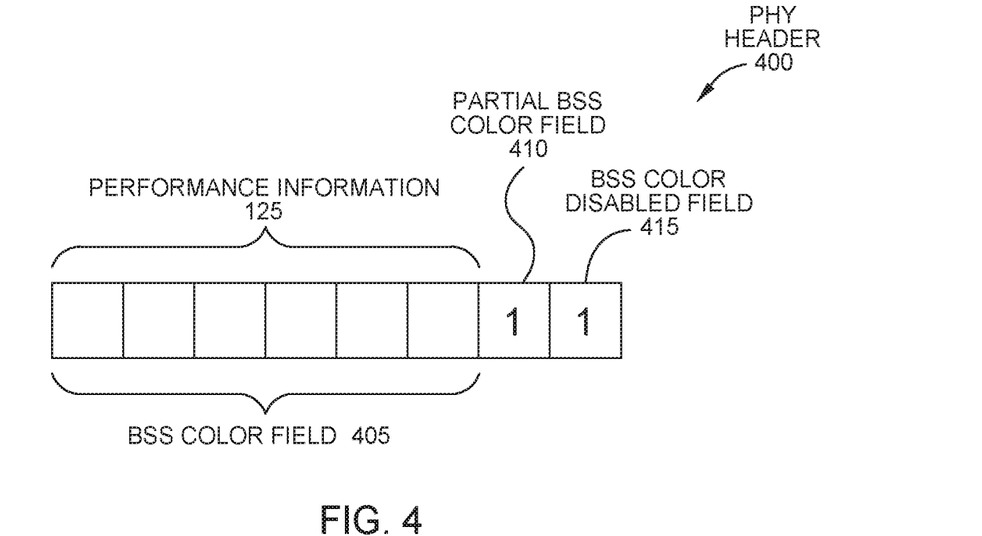
FIG. 4 illustrates a BSS color field repurposed for transmitting performance information concerning a service executing on the AP, according to one embodiment.

FIG. 4 illustrates a BSS color field repurposed for transmitting performance information concerning a service executing on the AP, according to one embodiment. That is, FIG. 4 illustrates a portion of a PHY header 400 which may be in the second wireless frame received at block 305 of method 300. As shown, the PHY header 400 includes a six bit BSS color field 405, a one bit partial BSS color field 410, and a one bit BSS color disabled field 415. Although these fields are shown as being contiguous in the header 400, in other examples they may be separated by bits for other fields.

The BSS color field 405 is typically used to transmit a BSS color value assigned to the wireless device transmitting the frame containing the PHY header 400. However, the transmitting wireless device has repurposed the BSS color field 405 to instead use the six bits to transmit the performance information 125. For example, the left three bits may indicate a type of the service executing on the device (e.g., HTTP, SSH, FTP, Voice over IP (VoIP), streaming, etc.) while the right three bits in the field 405 indicate the characteristics or requirements of the service—e.g., whether it is bandwidth intensive, requires low latency, cannot be used with other types of services, etc. In one another example, the six bits may correspond to a bit map that corresponds to different performance information. For example, each of the 64 possible values that can be generated by the six bits in the color field 405 can be mapped to performance information about different services. For example, one six bit value can indicate that the AP has an HTTP service that requires low latency, a second six bit value can indicate the AP has an HTTP service that has a special function, a third six bit value can indicate a FTP service cannot be used with another service in the wireless network for security reasons, and so forth. The bit map can be distributed to the wireless devices in the network so they can encode and decode the bits contained in the BSS color field 405.

In another embodiment, each bit in the BSS color field 405 is mapped to a specific characteristic or requirement regardless of the service. For example, Bit 0 may indicate whether the AP has a high bandwidth service, Bit 1 indicates whether the AP has a service that requires low latency, Bit 2 indicates whether the AP has a service that use a lot of multicast traffic, and so forth. The receiving wireless device may not know what the service is, but can nonetheless identify its characteristics.

In another example, the performance information 125 describes the traffic flow generated by the services rather than the services themselves. For example, the AP may monitor its traffic flow overtime and generate characteristics of the traffic flow (e.g., has a lot of time sensitive traffic, has steady bandwidth usage, has a lot of bursty traffic, etc.). The characteristics of the traffic can be an average of the traffic generated by all the services in the AP rather than being a characteristic of a particular service. The AP can encode the characteristics of the general traffic flow as performance information 125 in the BSS color field 405.

Further, not all of the bits in the BSS color field 405 have to be used for encoding the performance information 125. Instead, three or four bits can be used for the performance information 125 while other bits could be used for other metadata about the AP such as its performance status. For example, one bit in the field 405 can be used to specify whether the BSS color should be considered in the association rules. In yet another example, some of the bits may be used to transmit the performance status of the AP in parallel with transmitting the performance information 125 of the services on the AP.

In addition to the BSS color field 405, the PHY header 400 also includes the partial BSS color field 410 and the BSS color disabled field 415. These fields 410, 415 can be used by the transmitting wireless device to indicated to a receiving wireless device that the BSS color field 405 has been repurposed to include the performance information 125 (or more generally, to include metadata about the AP or the services executing on the AP). The IEEE 802.11ax standard maps different functions to the values of the fields 410, 415 depending on their functions. While the details of these functions are beyond the scope of this disclosure, the 802.11ax standard maps specific functions to the fields 410 and 415 when they have bit values of '0, 0', '1, 0', and '0, 1.' There is no function mapped to the bit combination of "1, 1". Thus, using a software upgrade, the wireless device can be programmed to recognize that a value of one in both the partial BSS color field 410 and the BSS color disabled field 415 indicates that the BSS color field 405 has been repurposed to contain metadata, rather than containing a BSS color value.

While the bit combination of '1, 1' is used to indicate the BSS color field 405 has been repurposed, any currently unused bit or bit pattern in the PHY header 400 could be used. For example, a future Wi-Fi standard may map a function to the bit combination of "1, 1" in the fields 410 and 415. In that case, a different, unused bit combination in the header 400 can be used to indicate to a receiving device that the BSS color field 405 has been repurposed. Thus, the embodiments herein are not limited to the BSS color field and can be used with other past or future Wi-Fi standards where different fields in the PHY header can be repurposed to carry the metadata.

Returning to the method 300, at block 310 the wireless device receives a third wireless frame where a first portion of the BSS color field indicates a performance status of the AP and second portion provides a BSS color. Various techniques for embedding metadata into the BSS color field are illustrated in FIGS. 5A and 5B.

Figure 5A:
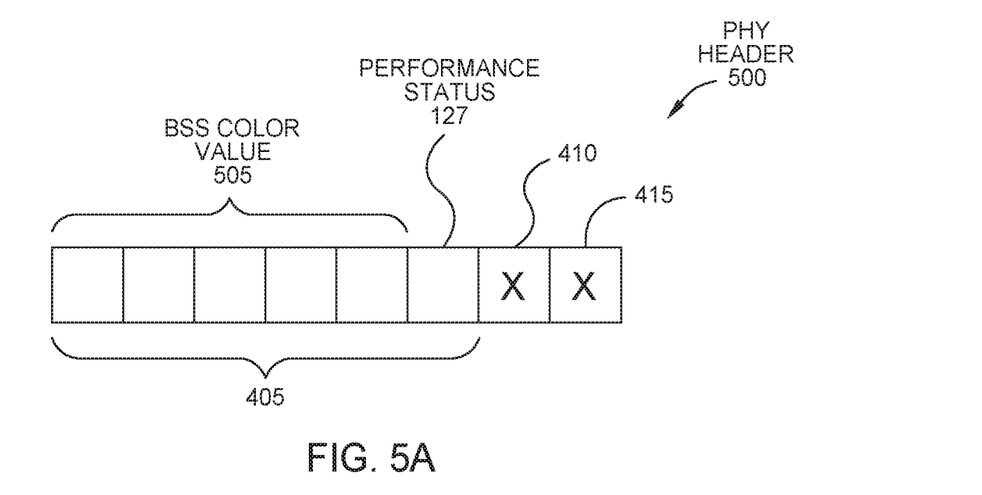
FIGS. 5A-5B illustrate BSS color fields repurposed for transmitting both a BSS color value and a performance status of the AP, according to one embodiment.
Figure 5B:
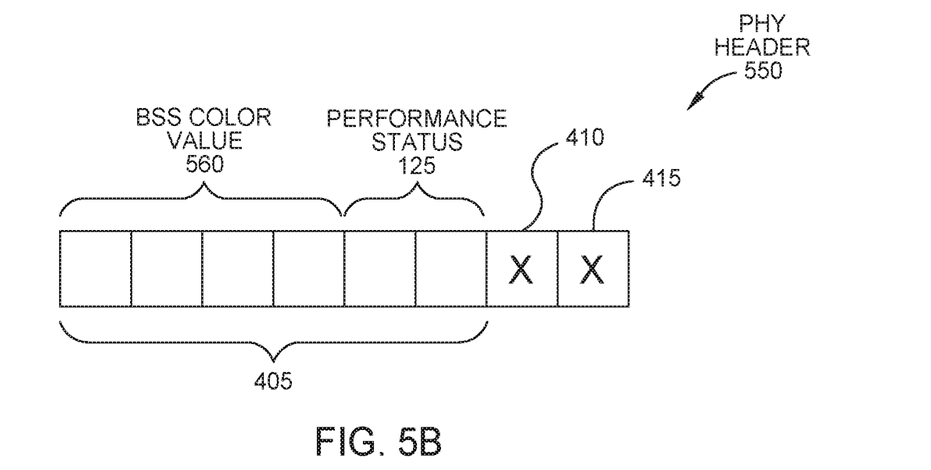

FIGS. 5A-5B illustrate BSS color fields repurposed for transmitting both a BSS color value and a performance status of the AP, according to one embodiment. FIG. 5A illustrates a PHY header 500 that includes the same pre-defined BSS color field 405, partial BSS color field 410, and BSS color disabled field 415 illustrated in FIG. 4. However, instead of repurposing the field 405 to transmit the performance information 125, the performance status 127 is added to the field 405 along with an abbreviated BSS color value 505. That is, the bits in the BSS color field 405 are subdivided where a first portion (e.g., five bits) are used to transmit the BSS color value 505 while one bit is used to transmit the performance status 127.

While the performance status 127 could be transmitted using the format of the PHY header 400 (where the performance status 127 is allocated all six bits in the BSS color field 405), the performance status 127 may require less bits than transmitting the performance information 125. In that case, the format in FIG. 5A may be preferred since the BSS color value 505 can be sent in parallel with the performance status 127. In this example, the partial BSS color field 410 and BSS color disabled field 415 may be any value since the BSS color field 405 can still include a BSS color value 505 unlike in FIG. 4 where there is no color value in the field 405. As such, the values of the field 410 and 415 are shown as X's or don't cares and may be different bit combinations.

However, since the wireless devices may be expecting the entire six bits in the BSS color field 405 to be used to represent the BSS color value 505 (as according to the 802.11ax standard), a WLAN controller may instruct the APs and endpoints that one bit in the color field 405 (e.g., the rightmost bit) provides the performance status 127 of the AP. Thus, when an AP or endpoint receives the PHY header 500, regardless of the values of the fields 410 and 415, the wireless device knows that the rightmost bit in the BSS color field 405 provides a performance status 127 of the transmitting wireless device. As mentioned above, the performance status 127 could indicate whether the wireless device is experiencing congestion (e.g., a value of 1 if yes, a value of 0 if no) or is currently out of service (e.g., a value of 1 if yes, a value of 0 if no).

The remaining bits in the field 405 indicate the BSS color value 505 of the transmitting wireless device. Thus, using the PHY header 500 assumes the five bits are sufficient to represent the BSS colors used in the wireless network.

The PHY header 550 in FIG. 5B is similar to the header 500 in FIG. 5A except that additional bits have been assigned to represent the performance status 125 (two bits in this example). That is, using one bit may not be sufficient, and instead two bits (or more) can be assigned to carry metadata about the AP. For example, the two bits could represent a utilization of the AP where "0, 0" is under 25% utilization, "0, 1" is between 25-50% utilization, "1, 0" is between 50-75% utilization, and "1, 1" is between 75-100% utilization.

Of course, the tradeoff with assigning more bits in the field 405 to the performance status 127 is less bits can be used to indicate a BSS color value 560 (four bits instead of five bits like in FIG. 5A). However, the various BSS color values 560 that can be represented by the four bits may be sufficient for the wireless network.

Like in FIG. 5A, the fields 410 and 415 have X's or don't cares since the BSS color field 405 still includes a BSS color value 560, albeit an abbreviated value relative to the 802.11ax standard. In any case, using the PHY headers 500 and 550 means that a single frame can include both a BSS color value as well as metadata. As such, in one embodiment, a wireless network may never use the format indicated in FIG. 4 where the special bit combination of the fields 410 and 415 indicate that the field 405 does not include a color value.

Returning to the method 300, at block 315 the wireless device receives a fourth wireless frame where a first portion of the BSS color field indicates a performance status of the AP and a second portion provides performance information of a service executing in the AP. An example of a PHY header in the fourth wireless frame is illustrated in FIG. 6.

Figure 6:
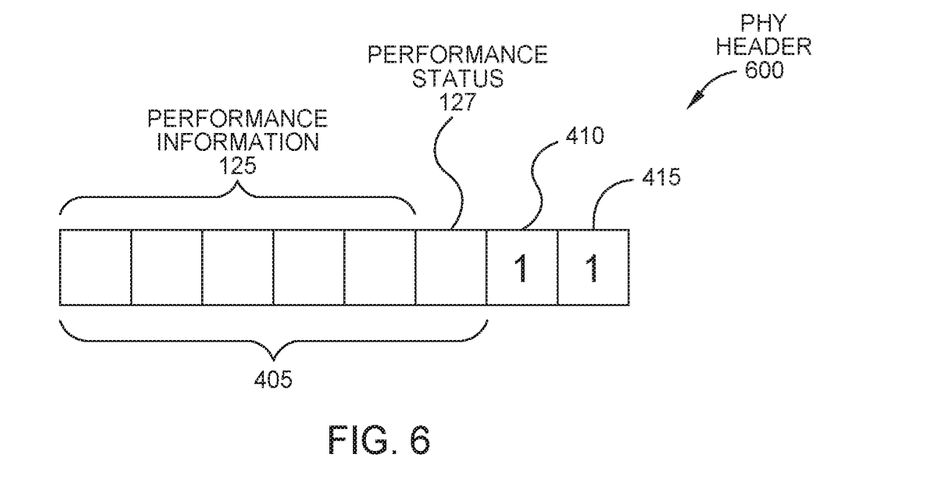
FIG. 6 illustrates a BSS color field repurposed for transmitting both performance information concerning a service executing on the AP and a performance status of the AP, according to one embodiment.

FIG. 6 illustrates a BSS color field 405 repurposed for transmitting both performance information concerning a service executing on the AP and a performance status of the AP, according to one embodiment. The PHY header 600 in FIG. 5 includes the BSS color field 405, the partial BSS color field 410, and the BSS color disabled field 415 like the headers illustrated in FIGS. 4, 5A, and 5B. In this example, however, the bits in the BSS color field 405 include both performance information 125 and performance status 127. Unlike in FIGS. 5A and 5B, the BSS color field 405 does not include a BSS color value but instead contains metadata regarding the AP and the services executing on the AP. While the PHY header 600 has five bits used to represent the performance information 125 and one bit representing the performance status 127, the bits may be allocated differently in other examples to provide additional bits for representing the performance status 127. Additionally, the performance information 125 and the performance status 127 can include any of the metadata described above.

Because the BSS color field 405 does not include a BSS color value (e.g., this field has been repurposed), in this embodiment, the partial BSS color field 410 and the BSS color disabled field 415 are set to "1, 1" to indicate to the receiving wireless device that the BSS color field 405 has been repurposed to carry metadata about the AP and its services. In one embodiment, the AP may transmit additional control messages to the wireless devices so that these wireless devices know whether to use the format illustrated in FIG. 4 or FIG. 6. For example, the frames may be synchronized so that frames sent at a certain time period that have the "1, 1" bit values in the fields 410 and 415 carry only performance information 125 in the BSS color field 405 as shown in FIG. 4. However, frames sent at a different predefined time period that have the "1, 1" bit values include both performance information 125 and performance status 127 in the BSS color field 405. In this manner, the receiving wireless devices know the particular format of the data in the BSS color field 405 so they can properly interpret the data.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   receiving, at a wireless device, a first frame comprising a first physical (PHY) header;
   determining a first color value from a basic service set (BSS) color field in the first PHY header;
   determining whether an association rule for the wireless device is satisfied based on the first color value and a BSS color assigned to the wireless device, wherein the association rule lists at least one color value that the wireless device either can or cannot share a channel with, wherein the at least one color value is different than the BSS color assigned to the wireless device;
   receiving at the wireless device a second frame comprising a second PHY header;
   determining that a BSS color field in the second PHY header contains metadata associated with an access point (AP); and
   comparing the metadata to the association rule, wherein the association rule indicates whether the wireless device should at least one of: move to a different channel or change its BSS color based on a value of the metadata and the first color value.

2. The method of claim 1, wherein the association rule is an affinity rule listing a plurality of color values with which the wireless device can share a channel with.

3. The method of claim 1, wherein the association rule is an anti-affinity rule listing a plurality of color values with which the wireless device cannot share a channel with.

4. The method of claim 1, wherein determining that the BSS color field in the second PHY header contains metadata comprises:
   identifying a predefined combination of bits in a partial BSS color field and a BSS color disabled field in the second PHY header.

5. The method of claim 1, wherein the metadata comprises performance information corresponding to a service provided by the AP transmitting the second frame, where the performance information is encoded into bits of the BSS color field in the second frame.

6. The method of claim 1, wherein the metadata comprises a current bandwidth and current utilization of an AP transmitting the second frame.

7. A wireless device, comprising:
   a processor; and
   memory comprising a program configured to perform an operation when executed by the processor, the operation comprises:
      determining a first color value from a BSS color field in a PHY header of a frame received at the wireless device; and
      determining whether an association rule for the wireless device is satisfied based on the first color value and a BSS color assigned to the wireless device, wherein the association rule lists at least one color value that the wireless device either can or cannot share a channel with at the same time the wireless device is assigned to the BSS color, wherein the at least one color value is different than the BSS color currently assigned to the wireless device.

8. The wireless device of claim 7, wherein the association rule is an affinity rule listing a plurality of color values with which the wireless device can share a channel with at the same time the wireless device is assigned to the BSS color, wherein the plurality of color values are all different from the BSS color currently assigned to the wireless device.

9. The wireless device of claim 7, wherein the association rule is an anti-affinity rule listing a plurality of color values with which the wireless device cannot share a channel with at the same time the wireless device is assigned to the BSS color, wherein the plurality of color values are all different from the BSS color currently assigned to the wireless device.

10. The wireless device of claim 7, wherein the operation further comprises:
    receiving at the wireless device a second frame comprising a second PHY header;
    determining that the BSS color field in the second PHY header contains metadata associated with an AP; and
    comparing the metadata to the association rule, wherein the association rule indicates whether the wireless device should at least one of: move to a different channel or change its BSS color based on a value of the metadata and the first color value.

11. The wireless device of claim 10, wherein determining that the BSS color field in the second PHY header contains metadata comprises:
    identifying a predefined combination of bits in a partial BSS color field and a BSS color disabled field in the second PHY header.

12. The wireless device of claim 11, wherein the metadata comprises performance information corresponding to a service provided by an AP transmitting the second frame, where the performance information is encoded into bits of the BSS color field in the second frame.

13. A wireless device, comprising:
    a processor; and
    memory comprising a program configured to perform an operation when executed by the processor, the operation comprises:
       identifying metadata associated with an AP;
       transmitting a first frame from the AP, the first frame comprising a first PHY header that includes a first indicator and a first field, wherein the first indicator indicates that the first field is repurposed to include the metadata; and
       transmitting a second frame from the AP containing a second PHY header comprising a second indicator and the first field, wherein the second indicator indicates that the first field contains data intended for the first field according to a Wi-Fi standard.

14. The wireless device of claim 13, wherein there first field is a BSS color field and the first field in the second frame contains a BSS color value, and wherein the first indicator and second indicators are different values of a partial BSS color bit and a BSS color disabled bit contained in the first and second PHY headers.

15. The wireless device of claim 14, wherein the BSS color field is assigned a predefined number of bits in the first and second PHY headers.

16. The wireless device of claim 14, wherein the metadata comprises performance information corresponding to a service provided by the AP, where the performance information is encoded into bits of the BSS color field in the first frame.

17. The wireless device of claim 14, further comprising:
    measuring at least one of a current bandwidth and current utilization of the AP, wherein the metadata represents the current bandwidth or utilization; and encoding the current bandwidth or utilization into the bits of the BSS color field in at least one of the first and second frames.

18. The wireless device of claim 17, wherein the BSS color field in the first frame comprises both performance information corresponding to a service provided by the AP and one of the current bandwidth or utilization.

19. The wireless device of claim 17, wherein the BSS color field in the second frame comprises both a BSS color value and one of the current bandwidth or utilization of the AP.

* * * * *